(12) United States Patent
Tsai

(10) Patent No.: US 8,612,430 B2
(45) Date of Patent: Dec. 17, 2013

(54) METHOD FOR SEARCHING DATA

(75) Inventor: Chia-Hung Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 2 days.

(21) Appl. No.: 13/363,389

(22) Filed: Feb. 1, 2012

(65) Prior Publication Data

US 2013/0054641 A1  Feb. 28, 2013

(30) Foreign Application Priority Data

Aug. 25, 2011  (TW) .............................. 100130538 A

(51) Int. Cl.
*G06F 17/30* (2006.01)

(52) U.S. Cl.
USPC ........................................ 707/728; 707/770

(58) Field of Classification Search
USPC ........................................ 707/728, 768, 770
See application file for complete search history.

(56) References Cited

U.S. PATENT DOCUMENTS

| | | | | |
|---|---|---|---|---|
| 8,271,516 B2* | 9/2012 | Gounares et al. | ............. | 707/768 |
| 8,458,157 B2* | 6/2013 | Alexander et al. | ............. | 707/706 |
| 2005/0060283 A1* | 3/2005 | Petras et al. | ....................... | 707/1 |
| 2007/0239610 A1* | 10/2007 | Lemelson | ....................... | 705/51 |
| 2009/0055325 A1* | 2/2009 | Leventhal et al. | .......... | 705/36 R |
| 2009/0287682 A1* | 11/2009 | Fujioka et al. | ..................... | 707/5 |
| 2009/0293079 A1* | 11/2009 | Mckee et al. | .................... | 725/10 |
| 2009/0307205 A1 | 12/2009 | Churchill et al. | | |
| 2010/0114938 A1* | 5/2010 | Weng | ............................ | 707/769 |
| 2010/0174709 A1* | 7/2010 | Hansen et al. | ................ | 707/728 |
| 2011/0055207 A1* | 3/2011 | Schorzman et al. | .......... | 707/723 |
| 2011/0087647 A1 | 4/2011 | Signorini et al. | | |
| 2011/0131106 A1* | 6/2011 | Eberstadt et al. | ............ | 705/26.1 |
| 2011/0258073 A1* | 10/2011 | Lifson | .......................... | 705/26.7 |

OTHER PUBLICATIONS

Ko, et al., "Socialnetworks Connect Services", Computer, Aug. 2010, vol. 43, p. 37-p. 43.
"Search Report of Europe Counterpart Application", issued on Dec. 6, 2012, p. 1-p. 8, in which the listed references were cited.

* cited by examiner

*Primary Examiner* — Cam-Linh Nguyen
(74) *Attorney, Agent, or Firm* — Jianq Chyun IP Office

(57) ABSTRACT

A method for searching data suitable for an electronic device is provided. A server is linked according to an input account, in which a plurality of user accounts and a plurality of marked results uploaded respectively by the user accounts are stored in the server. A searching string entered by the user is received through a browser. And searching in the server is performed so as to know whether or not the server contains the marked results with the above-mentioned searching string. The marked result and the corresponding user account are listed out when anyone of the marked results stored in the server contains the searching string.

6 Claims, 3 Drawing Sheets

| user account | marked result ||
| --- | --- | --- |
| | searching string | marking option |
| John | Harry Potter | having read |
| | GetMessage | having used |
| Edison | PeekMessage | having used |
| | Aspire one | having used |
| ······· |||

200

FIG. 2

METHOD FOR SEARCHING DATA

CROSS-REFERENCE TO RELATED APPLICATION

This application claims the priority benefit of Taiwan application serial no. 100130538, filed on Aug. 25, 2011. The entirety of the above-mentioned patent application is hereby incorporated by reference herein and made a part of this specification.

BACKGROUND OF THE INVENTION

1. Field of the Invention

The invention generally relates to a method for searching data, and more particularly, to a method for searching data by combining Internet information and experiences of interpersonal network.

2. Description of Related Art

Along with the popularity of computer and Internet, discussions or documents related to many issues can be queried on Internet, which encourages the modern people more and more rely on search engines to search data and look for answers. However, although some professional knowledge can be queried on Internet so as to find out the relevant data, but the following situation may limit a user to effectively utilize the searching results, such as the searching results are not clear enough or the user, due to insufficient background knowledge, is not aware of how to utilize the searching results.

Taking an example, it is assumed in a same developing team, every member is working on a same field direction; for example, there are 40 members in a developing team for developing a large software and each of them is required in charge of a respective case for individually developing sub-functions of the software. If one of the members is going to use an unfamiliar application programming interface (API) at the time, the member would take advantage of the search engine to query relevant documentation. Then, the member needs to understand the whole documentation starting from scratch. However, some other members in the developing team may have used the API for developing software and know the specific limitation of the API or may have sample program codes which can be referred to. Hence, only using the search engine to search data is not enough and may waste a lot of time, because the user in this way is limited to study the whole documentation by himself/herself.

SUMMARY OF THE INVENTION

Accordingly, the invention is directed to a method for searching data. By using the method, a user during querying data is able to know whether or not someone among his/her friends has queried the same data and which of the friends have the knowledge related to the queried data so that the user can contact the friends for further query.

The invention provides a method for searching data suitable for a electronic device. In the method, linking a server according to an input account, in which a plurality of user accounts and a plurality of marked results uploaded respectively by the user accounts are stored in the server, and the above-mentioned input account is one of the user accounts. And receiving a searching string through a browser. Moreover performing searching in the server according to the searching string. Listing out the marked result and the corresponding user account when anyone of the marked results stored in the server contains the searching string.

In an embodiment of the present invention, after the above-mentioned step of receiving the searching string through the browser, the method further includes displaying a plurality of marking options for a user to select and when one of the marking options is selected, uploading the searching string and the selected marking option to the server serving as a marked result of the input account.

In an embodiment of the present invention, after the above-mentioned step of receiving the searching string through the browser, the method further includes searching a plurality of web links conformable to the searching string in the Internet when a search button is enabled and displaying the marking options corresponding to the searching string according to the web links.

In an embodiment of the present invention, the above-mentioned step of displaying the marking options corresponding to the searching string according to the web links further includes obtaining a marking type according to the above-mentioned web links so as to display the marking options corresponding to the marking type, in which the marking type includes one of electronic product, book, AV product and living grocery.

In an embodiment of the present invention, the above-mentioned step of performing searching in the server according to the searching string includes performing searching in the server according to the searching string when a search button is enabled.

In an embodiment of the present invention, the above-mentioned method further includes displaying the picture of the user account corresponding to the marked result when anyone of the marked results stored in the server contains the searching string.

Based on the description above, the invention combines the Internet information and the experience of the interpersonal network to make the marked results not only limited to the data on Internet, but also providing the user with the experiences of the user's friends, so that the user is aware of which friends have the knowledge related to the data and the user can follow up for further query.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 2 is a schematic diagram of a table of marked result according to an embodiment of the invention.

DESCRIPTION OF THE EMBODIMENTS

Searching data through a search engine has become a major way for the modern people to find out answers. The invention provides a method for searching data, which is able to display corresponding marking options according to the type of the searching questions, to ask whether or not the searching correlates with the user experience and to record down the selected marking option and the searching string for other friends during searching the same question in future to know someone has searched the same data. In following, an embodiment is described to assist in understanding the exemplary implementation of the invention.

Figure 1:
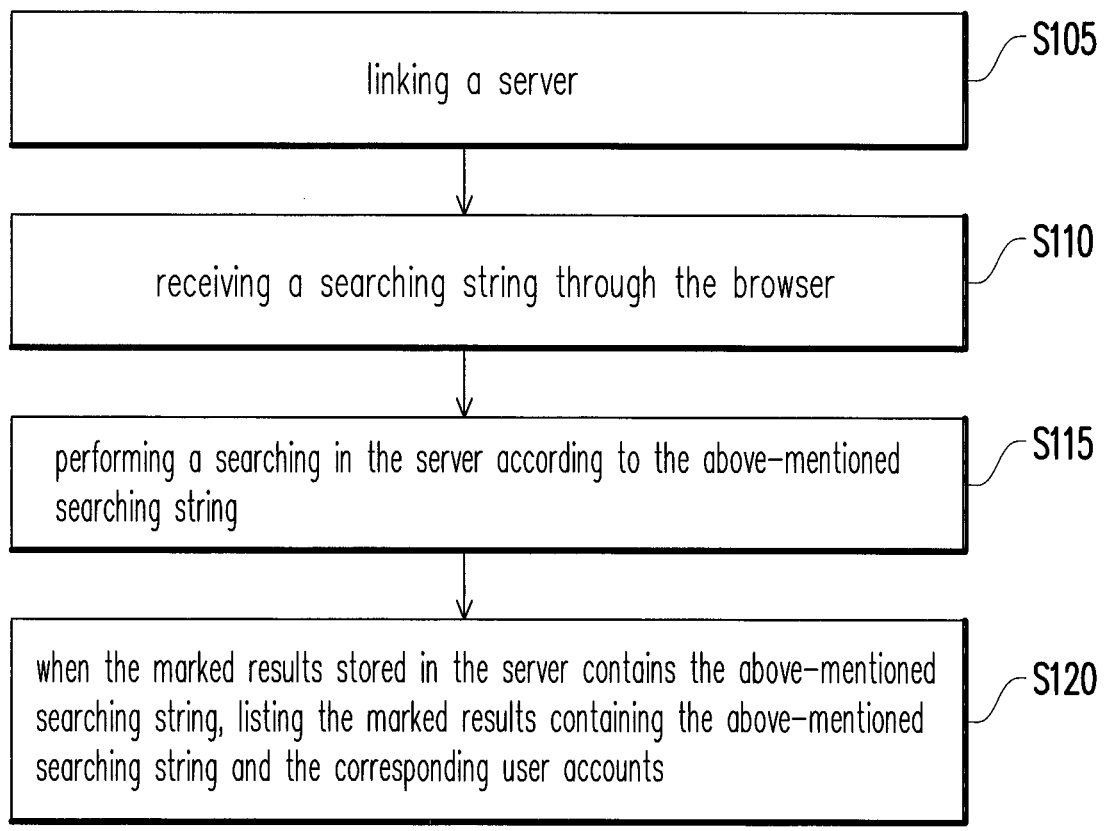
FIG. 1 is a schematic flowchart of the method for searching data according to an embodiment of the invention.

FIG. 1 is a schematic flowchart of the method for searching data according to an embodiment of the invention. In the embodiment, a browser of an electronic device installs a plug-in program, by which the user can perform a following method for searching data; but in other embodiments, the user can perform the following method for searching data directly through a browser. For example, the electronic device is a personal computer (PC), a notebook computer, a personal digital assistant (PDA) or a smart phone.

Referring to FIG. 1, in step S105, a server is linked according to an input account, which, for example, is performed by receiving the input account entered by the user so as to allow the user log in the server. A plurality of user accounts and a plurality of marked results uploaded respectively by the user accounts are stored in the server at the time. The input account is one of the above-mentioned user accounts. The marked results corresponding to each user are uploaded in the server respectively through the user accounts, and each of the marked results includes a searching string and a marking option.

For example, FIG. 2 is a schematic diagram of a table of marked result according to an embodiment of the invention. Referring to FIG. 2, a table of marked result 200 includes a field of user account and a field of marked result and each of the field of user account has a plurality of marked results. For example, a user account "John" has two marked results, and one of the marked results includes a searching string "Harry Potter" and a marking option "having read"; while another marked result includes a searching string "Get Message" and a marking option "having used". In addition, another user account "Edison" has also two marked results, and one of the marked results includes a searching string "Peek Message" and a marking option "having used"; while another marked result includes a searching string "Aspire one" and a marking option "having used".

Next in step S110, a searching string is received through the browser. Then, when the user presses down the searching button, the browser would search the web links conformable to the searching string in Internet. After that in step S115, a searching is performed in the server according to the above-mentioned searching string. That is to say, every marked result in the server is checked to judge whether or not the marked result contains the above-mentioned searching string.

Further in step S120, when the marked results stored in the server contains the above-mentioned searching string, the marked results containing the above-mentioned searching string and the corresponding user accounts are listed. In this way, the user can know the user accounts who have searched the searching string.

In addition, the user can also perform marking operation on the searching string, so as to upload the marked results to the server (as shown by FIG. 2). In more details, when the searching button is enabled, the web links conformable to the searching string are searched in Internet. Then, a marking type is obtained according to the found out web links so as to display the marking option corresponding to the marking type. For example, the leading-listed five found web links are uploaded into the server so that the server is able to judge which marking type the searching string is conformable to according to the leading-listed five found web links and the searching string. The marking type includes, for example, electronic product, book, AV product or living grocery, etc. When one of the marking options is selected, the searching string and the selected marking option are uploaded to the server as a corresponding marked result for the user account.

For example, referring to FIG. 2, it is assumed a user has read the book of "Harry Potter" and also wants to go to Internet to see what ones other people have learned. When the user uses a browser to link a search engine through his user account "John" and enters a searching string "Harry Potter", the plug-in program of the browser can query the string in the server according to the websites of the leading-listed three web links so as to determining the searching string "Harry Potter" is related to books to obtain the marking type "book", and further, the browser displays the corresponding marking options, for example, three marking options of "wishing to read", "being reading" and "having read". Then, when the user selects the marking option of "having read", a marked result containing the searching string "Harry Potter" and the selected marking option "having read" would be uploaded into the server at the bottom of the records of the user account "John".

Taking another example, it is assumed another user bought a notebook computer and wishes to know through Internet what operation details about the notebook computer need to pay attention to and what driver can be downloaded to update the computer. Then, the user starts a browser, enters the user account "Edison" to log in the server and uses the search engine to input the brand of the notebook computer (for example, "Aspire One") serving as a searching string for searching. The plug-in program of the browser, at the time, would query the server and is aware of the searching string "Aspire One" is related to the notebook computer to obtain the marking type "electronic product". Then, the browser displays the corresponding marking options, for example, three marking options of "wishing to use", "being using" and "having used". Then, when the user selects the marking option is "being using", the plug-in program of the browser would make the searching string and the selected marking option uploaded into the server at the bottom of the records of the user account "Edison".

In this way, the server can store the marked results uploaded by various user accounts therein, as shown by FIG. 2. In FIG. 2, the table of marked result 200 records that the user account "John" has searched the searching string "Harry Potter" with a marking option "having read" therein. Assuming yet another user account "Alex" is within the friend list of the user account "John" at a social networking service. When the user account "Alex" also inputs the searching string "Harry Potter" in the browser, the plug-in program of the browser would upload the searching string to the server for searching and then know that the user account "John" queried the searching string "Harry Potter" with a marking option "having read" ever before. Accordingly, Alex is aware of he can contact John for borrowing the book or for discussing so as to achieve functions of exchanging the needs and sharing information by one another.

In the table of marked result 200 of FIG. 2, a data of that the user account "Edison" has searched "Aspire One" with a marking option "having used" is recorded. When yet another user account "David" is within the friend list of the user account "Edison" at a social networking service. When the user account "David" also wants to query the price of the notebook computer to be purchased or the review rating on Internet, he inputs the searching string "Aspire One" in the browser, and then, the plug-in program of the browser would upload the searching string to the server for searching, so that David knows that the user account "Edison" queried the searching string "Aspire One" with a marking option "having used" ever before. Accordingly, David can contact Edison to query the experience of Edison or to ask whether or not Edison intends to resell his computer.

Figure 3:
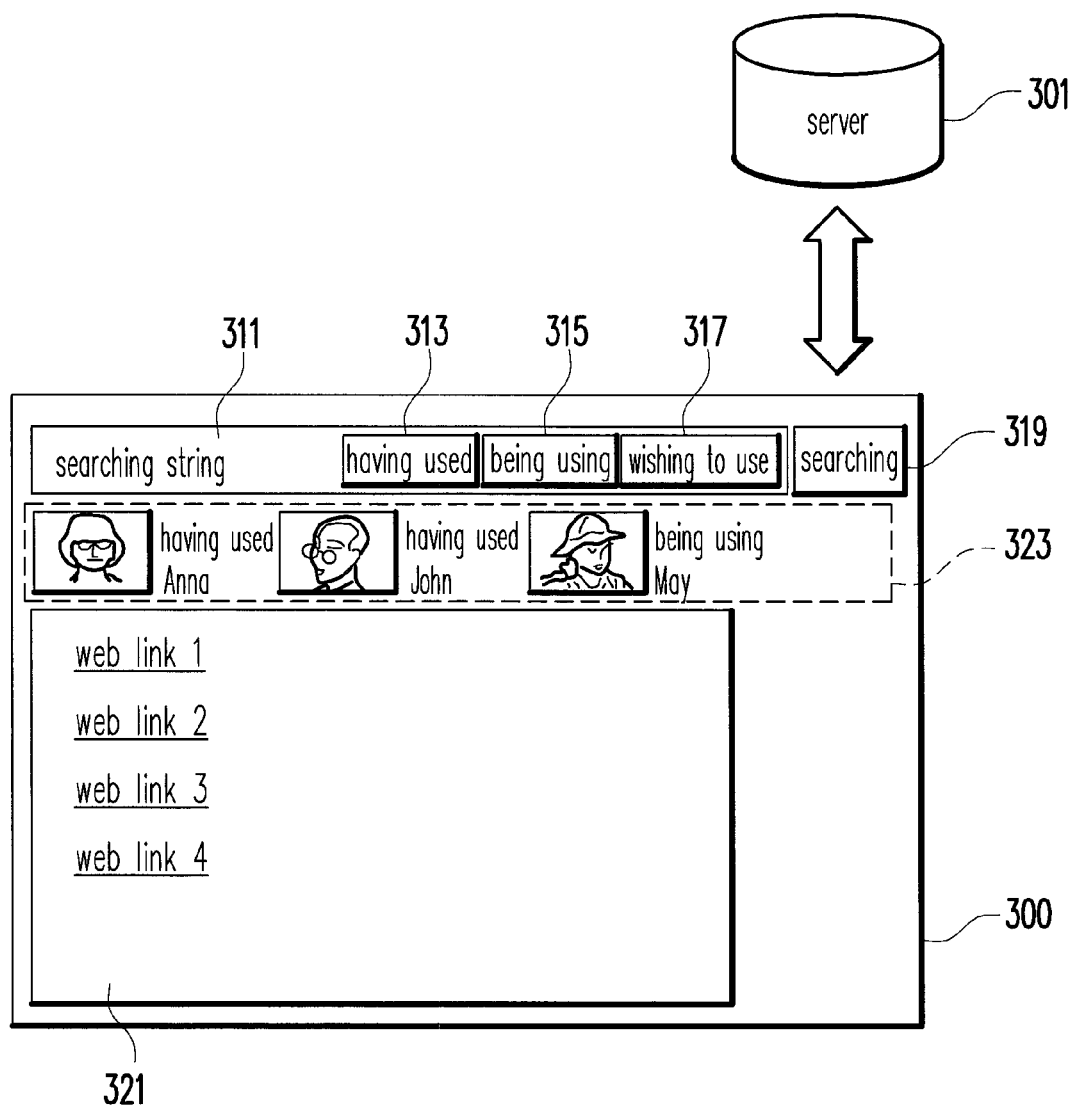
FIG. 3 is a schematic diagram of a browser according to an embodiment of the invention.

In following, another example, is described. FIG. 3 is a schematic diagram of a browser according to an embodiment of the invention. Referring to FIG. 3, a browser 300 links a server 301 for query, in which a searching row 311 is used for receiving searching strings. When a search button 319 is enabled, a searching result block 321 displays the found web links therein, followed by searching the user accounts in the server 301 who uploaded the searching string ever before and displaying the user accounts and the marking options selected by the user accounts about the above-mentioned searching string in a displaying block of contact 323, even displaying the pictures of the user accounts corresponding to the marked results. In addition, after uploading the searching string to the server 301 for judging the corresponding marking type, the browser 300 further displays the corresponding marking options 313, 315 and 317 therein for the user to select the relevant marking option.

In summary, the invention uses the network message sorting function of search engine in combination with friend links of social networking service to integrate the Internet information and the experience of the interpersonal network. As a result, the marked results not only are limited to the data on Internet, but also include the experiences of the own friends and colleagues found out by searching. Since most of the friends in a social networking service are those belonging to the daily life circle, work circle, and school circle of his/her own so that those friends have similar opportunities to the own idea, professional knowledge and interest. As explained by the above-described embodiment, the present invention can reveal out the knowledge unrecorded on Internet through the results of the search engine. By sharing the experiences of the friends on the community website, the valued knowledge can be better utilized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for searching data suitable for an electronic device, the method comprising:

linking a server according to an input account by a processor of the electronic device, wherein a plurality of user accounts and a plurality of marked results uploaded respectively by the user accounts are stored in the server, and the input account is one of the user accounts;

receiving a searching string through a browser by the processor;

performing searching in the server according to the searching string by the processor;

listing out the marked result and the corresponding user account by the processor when anyone of the marked results stored in the server contains the searching string;

displaying a plurality of marking options for a user to select by the processor, wherein the marking options include a wishing to do option, a being doing option, and a having done option; and uploading the searching string and the selected marking option to the server serving as a marked result of the input account by the processor when one of the marking options is selected.

2. The method for searching data as claimed in claim 1, wherein after the step of receiving the searching string through the browser, the method further comprises:

searching a plurality of web links conformable to the searching string in an Internet when a search button is enabled; and displaying the marking options corresponding to the searching string according to the web links.

3. The method for searching data as claimed in claim 2, wherein the step of displaying the marking options corresponding to the searching string according to the web links comprises:

obtaining a marking type according to the web links so as to display the marking options corresponding to the marking type.

4. The method for searching data as claimed in claim 3, wherein the marking type comprises one of electronic product, book, AV product and living grocery.

5. The method for searching data as claimed in claim 1, wherein the step of performing searching in the server according to the searching string comprises:

performing searching in the server according to the searching string when a search button is enabled.

6. The method for searching data as claimed in claim 1, wherein when anyone of the marked results stored in the server contains the searching string, the method further comprises:

displaying the picture of the user account corresponding to the marked result.

\* \* \* \* \*